350-3.61 SR

XR 3,695,879

SEARCH ROOM

United States Patent 3,695,879

Patented Oct. 3, 1972

SUBSTITUTE FOR MISSING XR 3,695,879

HOLOGRAM LIFE EXTENSION

Frank P. Laming and Solomon L. Levine, Poughkeepsie, and Glenn T. Sincerbox, Wappingers Falls, N.Y., assignors to International Business Machines Corporation, Armonk, N.Y.

No Drawing. Filed Apr. 20, 1970, Ser. No. 30,306
Int. Cl. G03c 5/24
U.S. Cl. 96—48 16 Claims

ABSTRACT OF THE DISCLOSURE

Laser-interrogated holograms produced in silver halide emulsions by an etch-bleach development process have desirable properties of light diffraction efficiency but are subject to rapid loss of diffraction effectiveness over periods of exposure to high energy density levels of interrogation light. It has been found that post-development hardening, especially by successive application of a hardening solution and heat, can prolong effectiveness half-life by a considerable factor. The heating step is most effective when carried out in vacuum or inert gaseous atmosphere.

BACKGROUND OF THE INVENTION

(1) Field of the invention

The invention concerns post-development processing of high-efficiency holograms subject to interrogation by high energy density levels of laser light; especially holograms produced in silver halide emulsions by etch-bleach development. More particularly the invention pertains to post-development hardening of such holograms. Fully processed phase holograms obtained by this method are especially effective in random access binary storage applications.

(2) Description of the prior art

Although there is considerable published and patented prior art dealing with hardening of photosensitive emulsions, we know of no prior consideration of post-development hardening as presently contemplated for extending useful lifetime of diffraction efficiency of etch-bleach developed silver halide holograms which are subject to interrogation by high energy density levels of laser radiation.

DETAILED DESCRIPTION

The term "archival" will be used herein to characterize prolonged longevity of usefulness of records such as holograms. Thus hologram records subject to repeated interrogation by high energy density levels of laser light are said to possess archival properties if they retain a given level of light diffraction efficiency for a relatively long period of interrogation usage.

High efficiency holograms which are rendered archival by subject post-development handling are developed typically by the following process:

(a) A silver-halide emulsion on a glass plate, having received exposure to coherent light as required to produce a phase hologram image pattern, is successively pre-hardened by Kodak Prehardener SH–5 (10 min.), washed in water (5 min.) and developed by the process next described. The composition and usage of SH–5 predevelopment hardening baths are described in the literature (refer to Photographic Chemistry, Vol. 1, P. Glafkides, p. 150).

(b) Development typically includes:

immersion in D–76 developer solution (7 min.)
immersion in stop bath (1 min.)
fixing in fixer bath (3 min.)
washing in $H_2O$ (10 min.)
drying in air
immersion in EB–2 etch-bleach bath (5 min.)
further washing in $H_2O$ (10 min.)
final drying Composition and usage of D–76 developer and EB–2 etch-bleach bath compositions are also extensively treated in the art literature; refer for example to Kodak Professional Data Book, J–1, page 36 and page 95 in Glafkides supra for D–76 (also termed Borax) developers and to Stevens, Microphotography, John Wiley and Sons, Inc. 1968, page 482 for specification of the EB–2 bath "Kodak" formula.

STATEMENT OF PROBLEM

The developed plate is a phase hologram which may be used as a binary record in a storage system of the kind described in the IBM Technical Disclosure Bulletin, vol. 8, No. 11, April 1966, pages 1581–1583, in the article "Hologram Memory for Storing Digital Data" by V. A. Vitols. In one such system these hologram records are interrogated by deflected laser light (e.g. argon at 5145 A.) at high energy density levels (i.e. on the order of 20 watts/cm.$^2$). Although such developed phase holograms possess high diffraction efficiency and high quality of information read-out, which are properties essential to the system application, the efficiency is found to decay rapidly with use due to darkening of the emulsion by the intensive interrogation laser. Consequently, it became apparent that such holograms would not have archival functionality without further processing, and in the course of experimentation the treatment next described was found.

ARCHIVAL (POST-DEVELOPMENT HARDENING) TREATMENT

According to the present invention, above hologram plates receiving post-development hardening treatments described in following examples are rendered more archival to varying degrees. It will be seen that substantial degrees of archivalness can be achieved.

Example 1

(a) Developed plate was immersed for 5 minutes in a dichromate/chloride solution (equal parts solutions A and B, solution A consisting of 20 gm. $(NH_4)_2Cr_2O_7$ and 14 ml. concentrated $H_2SO_4$ diluted to 1 liter; solution B consisting of 45 gms. NaCl diluted to 1 liter) with water added to dilute (10 parts water per parts of A, B mixture).

(b) Plate was next rinsed (3 to 5 minutes) in dilute bisulphite solution (15 gm. sodium bisulphite/liter $H_2O$) to remove excess dichromate.

(c) Plate was then successively air-dried, heated in vacuum (approx. 200° C.) for ½ hour in oven preheated for ½ hour), and gradually cooled (2½ hours).

Example 2

After development plate was immersed in dichromate and bisulphite solutions as in Example 1 and washed for 15 minutes but not heated.

Example 3

After development plate was heated but not solution treated.

Example 4

After development and three times in succession plate was alternately exposed to laser (in 5145 A. range) and immersed briefly in the dichromate solution given in Example 1. Same plate was finally treated with bisulphite rinse and heat as in Example 1.

Example 5

After development plate received laser exposure (in 5145 A. range) as control. Then plate was heated for ½ hour in vacuum.

Example 6

After development plate was immersed successively for 5 minutes in dichromate solution, as in Example 1 but without added water, and for 5 minutes in bisulphite solution of Example 1. Then plate was dried by alcohol rinse and heated for ½ hour in vacuum (at 200° C.).

Example 7

Same as 6 but with dichromate/chloride solution diluted by added water as in Example 1.

Example 8

Same as 7 but exposed to short λ UV light for 1 hour prior to treatment.

Example 9

No treatment (control).

Example 10

Dichromate and bisulphite same as in Example 1; no heat.

Example 11

Same as 10 but followed by heating in air (250° C.).

Example 12

Same as 10 but followed by heating (190° C.) in HE atmosphere.

Example 13

Same as 10 but followed by heating (180° C.) in vacuum.

Example 14

Same as 10 but followed by heating (200° C.) in N2 atmosphere.

Example 15

Similar to Example 1 except 20% formaldehyde solution used instead of dichromate. Bisulphite rinse eliminated and heat applied in N2 atmosphere.

Post treated plates were tested for half-life of diffraction efficiency $t½$ (time to reach 50% of initial efficiency) by exposure to continuous laser energy (in the 5145 A. spectral range). It will be seen that such testing is considerably more severe than actual service conditions in memory applications where typically it is expected that pulsed exposures would be employed, with not greater than 50% duty cycle, allowing the hologram gelatin time to recover from the effects of each exposure.

Results and conditions of these tests are summarized in the following table.

TABLE

| Example | Post-development treatment | Laser energy-density level (watts/cm.²) | t ½ (hours) | Knoop micro-hardness (at t ½) |
|---|---|---|---|---|
| 1 | Dilute dichromate and heat in vacuum | 0.5 | [1] 10.3 | Not measured. |
| 2 | Dilute dichromate only; no heat | 0.5 | [1] 1.02 | Do. |
| 3 | Heat only | 0.5 | [1] 0.88 | Do. |
| 4 | Dilute dichromate and heat | 0.5 | [1,2] 1.02<br>[1,3] 10.03 | Do. |
| 5 | None (control)<br>Heat only | 0.5 | [1,2] 0.21<br>[1,3] 0.89 | Do.<br>Do. |
| 6 | Undiluted dichromate, alcohol dry and heat. | 0.5 | [1] 10.7 | Do. |
| 7 | Dilute dichromate, alcohol dry, and heat. | 0.5 | [1] 15.1 | Do. |
| 8 | Same as 7 with UV pre-exposure | 0.5 | [1] 9.75 | Do. |
| 9 | None (control) | [4] 9.0 | 0.014 | 30. |
| 10 | Dilute dichromate only | [4] 9.0 | 0.18 | 32. |
| 11 | Dilute dichromate plus heat (air) | [4] 0.9 | [1] 0.55 | 43.3. |
| 12 | Dilute dichromate plus heat (He) | [4] 9.0 | [1] 0.95 | 52.6. |
| 13 | Dilute dichromate plus heat (Vac.) | [4] 9.0 | [1] 1.05 | 53.7. |
| 14 | Dilute dichromate plus heat (N2) | [4] 9.0 | [1] 0.90 | 54.9. |
| 15 | Formaldehyde plus heat (N2) | [4] 9.0 | [1] 1.02 | 54.7. |

[1] Value determined by conservative extrapolation estimate based upon trend of efficiency-time data.
[2] Value before heating as control reference.
[3] Value after heating.
[4] Level increased to accelerate aging and expedite tests.

The examples described above and tabulated results suggest the following conclusions:

(1) Half-life of diffraction efficiency, for the particular holograms and wave length of light under investigation (5145° A.), relates functionally to post-development hardness.

(2) Half-life appears to increase exponentially with linear increases in post-development hardness.

(3) Post-development hardening by heat only or by solution treatment only is accompanied by as much as a five-fold increase in $t½$ (compare $t½$ values Example 5; or compare $t½$ before heat in Example 5 with $t½$ in Examples 2 and 3; or compare $t½$ Example 9 with $t½$ Example 10).

(4) Post-development hardening by both solution and heat treatments produces an order of magnitude larger increase in $t½$ than hardening by exclusive use of heat or solution. This is seen by comparing $t½$ for Example 7 with $t½$ for Example 5 before heat (Increase Factor=15.1/0.21=72)

or by comparing $t½$ for Examples 13 and 9 (Increase Factor=1.05/0.014=75).

(5) Post-development hardening by heat is effective in vacuum, inert gaseous atmosphere, air and, by logical extension, any atmosphere are detrimental to the hologram structure. However, heating in vacuum or inert gaseous atmosphere (Examples 12–15) is almost twice as effective as in air (Example 11).

(6) The mechanism of post-development hardening by heat most logically would be the cross-linking of the gelatin containing the hologram. Accordingly heating temperature is an important factor only in regard to accelerating the hardening process while avoiding decomposition of the gelatin. The range 180° C.–250° C. appears best suited for this.

(7) Final drying is effective in any atmosphere (air, alcohol rinse, oven, etc.).

(8) Concentrated dichromate is only slightly less effective than dilute dichromate.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. Method of increasing half-life of diffraction efficiency of laser interrogated holograms developed by an etch-bleach process in silver-halide gelatin media comprising:

subjecting said developed holograms to a post-development hardening treatment effective to promote retention of diffraction efficiency under conditions of prolonged exposure to high energy density levels of interrogation radiation; said post-development treatment comprising:

heating said holograms in the non-decomposing temperature range 180°–250° C.

2. The method of claim 1 wherein said heating is carried out in inert atmosphere.

3. The method of claim 1 wherein said heating is carried out in a vacuum.

4. The method of claim 2 wherein said atmosphere is primarily nitrogen.

5. The method of claim 2 wherein said atmosphere is primarily helium.

6. Method of increasing half-life of diffraction efficiency of laser interrogated holograms developed by an etch-bleach process in silver-halide gelatin media comprising:

subjecting said developed holograms to a post-development hardening treatment effective to promote retention of optical diffraction efficiency under conditions of prolonged exposure to high energy density levels of sensing radiation;

contacting said holograms with a solution containing a gelatin hardening agent selected from the group consisting of dichromate/chloride and formaldehyde; and subjecting said holograms to an additional hardening treatment which involves heating the holograms in the non-decomposing temperature range 180°–250° C.

7. Method of increasing half-life of diffraction efficiency of laser interrogated holograms developed by an etch-bleach process in silver-halide gelatin media comprising:

subjecting said developed holograms to a post-development hardening treatment effective to promote retention of diffraction efficiency under conditions of prolonged exposure of said holograms to high energy density levels of laser interrogation radiation; said post-development treatment comprising:

contacting said holograms with a solution containing a gelatin hardening agent selected from the group consisting of dichromate/chloride and formaldehyde;

said holograms contacted by said solution being subjected to the additional treatment of rinsing in a dilute sodium bisulphite solution.

8. The method of claim 6 wherein said heating is carried out in inert atmosphere.

9. The method of claim 6 wherein said heating is carried out in a vacuum.

10. The method of claim 8 wherein said atmosphere is primarily nitrogen.

11. The method of claim 8 wherein said atmosphere is primarily helium.

12. For prolonging light diffraction efficiency in phase hologram records under conditions of active usage including exposure to high energy density levels of laser sensing radiation in the green visible spectral range, said records produced by image-wise exposure and development of silver-halide emulsion media, in a development process including successive stages of pre-hardening, developing, fixing, etch-bleach development and final washing and drying; the additional process step of:

subjecting said developed hologram records to post-hardening treatment effective to promote retention of optical diffraction efficiency in said records under conditions of prolonged exposure of said record to high energy density levels of said sensing radiation and particularly effective thereby to prolong the period of useful service of said hologram records.

13. The process of claim 12 wherein said post-hardening step includes successive application, to the gelatin containing the developed hologram record, of a hardening solution and heat in the temperature range 180° C.–250° C. below the decomposition point of the gelatin.

14. The process of claim 12 wherein said post-hardening step is accomplished by successively:

contacting the gelatin containing the developed hologram record with a solution of hardening agent selected from the group consisting of formaldehyde and dichromate/chloride;

rinsing said gelatin with a bisulphite solution if contacted by said dichromate agent; and heating said gelatin in a vacuum or inert gaseous atmosphere in the temperature range 180° C.–250° C., said temperature being insufficient to cause the gelatin to decompose.

15. The process of claim 13 wherein said hardening solution contains a hardening agent selected from the group consisting of dichromate/chloride and formaldehyde.

16. The process of claim 13 wherein said heat is applied in a vacuum or inert gaseous atmosphere.

References Cited

UNITED STATES PATENTS

| | | | |
|---|---|---|---|
| 1,763,533 | 6/1930 | Miller | 96—111 |
| 3,045,531 | 7/1962 | Prescott | 350—162 |
| 3,484,154 | 12/1969 | Swing et al. | 96—38.3 |

FOREIGN PATENTS

| | | | |
|---|---|---|---|
| 549,463 | 11/1942 | Great Britain | 96—35 |

OTHER REFERENCES

Russo et al., Applied Optics, 7, p. 202, January 1968.

Upatnieks et al., Applied Optics, 8, pp. 85–89, January 1969.

NORMAN G. TORCHIN, Primary Examiner

E. C. KIMLIN, Assistant Examiner

U.S. Cl. X.R.

96—27, 111, 38.3